United States Patent
Nagata et al.

(10) Patent No.: US 9,769,809 B2
(45) Date of Patent: Sep. 19, 2017

(54) RADIO COMMUNICATION SYSTEM, BASE STATION APPARATUS AND RADIO COMMUNICATION METHOD

(71) Applicant: NTT DOCOMO, INC., Tokyo (JP)

(72) Inventors: Satoshi Nagata, Tokyo (JP); Kazuaki Takeda, Tokyo (JP); Hideaki Takahashi, Tokyo (JP); Yoshihisa Kishiyama, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 25 days.

(21) Appl. No.: 14/387,445

(22) PCT Filed: Mar. 18, 2013

(86) PCT No.: PCT/JP2013/057696
§ 371 (c)(1),
(2) Date: Sep. 23, 2014

(87) PCT Pub. No.: WO2013/146434
PCT Pub. Date: Oct. 3, 2013

(65) Prior Publication Data
US 2015/0029982 A1    Jan. 29, 2015

(30) Foreign Application Priority Data
Mar. 30, 2012    (JP) .................... 2012-081303

(51) Int. Cl.
*H04J 11/00* (2006.01)
*H04W 28/18* (2009.01)
(Continued)

(52) U.S. Cl.
CPC ....... *H04W 72/042* (2013.01); *H04J 11/0023* (2013.01); *H04W 28/18* (2013.01); *H04W 48/00* (2013.01); *H04W 88/08* (2013.01)

(58) Field of Classification Search
None
See application file for complete search history.

(56) References Cited

U.S. PATENT DOCUMENTS 8,687,584 B2    4/2014  Yang et al.
2011/0141987 A1  6/2011  Nam et al.
(Continued)

FOREIGN PATENT DOCUMENTS

EP    2056515 A1    5/2009
JP    2013-123141 A   6/2013
(Continued)

OTHER PUBLICATIONS

International Search Report for corresponding International Application No. PCT/JP2013/057696, mailed Jun. 25, 2013 (1 page).
(Continued)

*Primary Examiner* — Chi H Pham
*Assistant Examiner* — Soon-Dong D Hyun
(74) *Attorney, Agent, or Firm* — Osha Liang LLP (57) ABSTRACT

The present invention is designed to report parameters related to techniques provided for in the LTE-A system to a user terminal with adequate timing. The radio communication method of the present invention provides a radio communication method in a radio communication system having a base station apparatus that is configured in compliance with LTE-Advanced system standards, and a user terminal that is configured to be able to perform radio communication with the base station apparatus, and, in this radio communication method, the base station apparatus generates downlink control channel information related to an enhanced physical downlink control channel, and notifies the downlink control channel information to the user terminal using an RRC Connection Reconfiguration signal, and the user terminal receives the RRC Connection Reconfigu-
(Continued)

ration signal, and sets up the downlink control channel information.

6 Claims, 9 Drawing Sheets

(51) Int. Cl.
    *H04W 72/04*     (2009.01)
    *H04W 48/08*     (2009.01)
    *H04W 48/00*     (2009.01)
    *H04W 88/08*     (2009.01)

(56) References Cited

U.S. PATENT DOCUMENTS

| | | | | |
|---|---|---|---|---|
| 2011/0170435 | A1 | 7/2011 | Kim et al. | |
| 2011/0269442 | A1 | 11/2011 | Han et al. | |
| 2012/0120842 | A1* | 5/2012 | Kim | H04B 7/024 370/252 |
| 2013/0010715 | A1* | 1/2013 | Dinan | H04W 72/0406 370/329 |
| 2013/0044707 | A1* | 2/2013 | Chen | H04W 72/1231 370/329 |
| 2013/0201851 | A1* | 8/2013 | Chou | H04W 24/02 370/252 |
| 2013/0250879 | A1* | 9/2013 | Ng | H04W 72/042 370/329 |
| 2013/0250882 | A1* | 9/2013 | Dinan | H04W 72/0426 370/329 |
| 2013/0301543 | A1* | 11/2013 | Eriksson | H04W 72/00 370/329 |
| 2014/0056279 | A1* | 2/2014 | Chen | H04B 7/0456 370/330 |
| 2014/0071934 | A1* | 3/2014 | Frenne | H04L 5/001 370/330 |
| 2014/0247775 | A1* | 9/2014 | Frenne | H04L 5/0048 370/329 |
| 2014/0355529 | A1* | 12/2014 | Zhu | H04N 21/2365 370/329 |
| 2015/0249526 | A1* | 9/2015 | Kim | H04L 5/0048 370/329 |

FOREIGN PATENT DOCUMENTS

| | | |
|---|---|---|
| WO | 2010/147853 A2 | 12/2010 |
| WO | 2011/112036 A2 | 9/2011 |
| WO | 2013/140437 A1 | 9/2013 |

OTHER PUBLICATIONS

Samsung; "E-PDCCH multiplexing with PDSCH;" 3GPP TSG RAN WG1 #68, R1-120189; Dresden, Germany; Feb. 6-10, 2012 (2 pages).
3GPP TR 25.912 V7.1.0; "3rd Generation Partnership Project; Technical Specification Group Radio Access Network; Feasibility study for evolved Universal Terrestrial Radio Access (UTRA) and Universal Terrestrial Radio Access Network (UTRAN) (Release 7);" Sep. 2006 (57 pages).
Research in Motion et al.; "Further Discussion on Reference Signals for E-PDCCH"; 3GPP TSG RAN WG1 Meeting #68, R1-120332; Dresden, Germany; Feb. 6-10, 2012 (5 pages).
LG Electronics; "Consideration on Interference measurement RE configuration"; 3GPP TSG RAN WG1 Meeting #68b, R1-121810; Jeju, Korea; Mar. 26-30, 2012 (3 pages).
Samsung; "CSI-RS Scrambling for DL CoMP"; 3GPP TSG RAN WG1 Meeting #67, R1-120175; Dresden, Germany; Feb. 6-10, 2012 (2 pages).
Office Action issued in corresponding Japanese Application No. 2012-081303, mailed Jul. 5, 2016 (9 pages).
Panasonic; "Signalling Support for CRS Interference Handling in Low Power ABS"; 3GPP TSG-RAN WG1 Meeting #68bis, R1-121146; Jeju, Korea; Mar. 26-30, 2012 (3 pages).
Panasonic; "Multiplexing of ePDCCHs and ePDCCH RE mapping"; 3GPP TSG RAN WG1 Meeting #68bis, R1-121163; Jeju, Korea; Mar. 26-30, 2012 (5 pages).
Notification of Reasons for Rejection issued in the counterpart Japanese Patent Application No. 2012-081303, mailed Dec. 1, 2015 (10 pages).
Ericsson et al.; "Flexible DM-RS Configuration for Dynamic Inter-Point Coordination;" 3GPP TSG-RAN WG1 #68, R1-120787; Dresden, Germany; Feb. 6-10, 2012 (3 pages).
CATT; "On configuration of UE-specific UL DMRS;" 3GPP TSG RAN WG1 Meeting #68bis, R1-121096; Jeju, Korea; Mar. 26-30, 2012 (3 pages).
Alcatel-Lucent; "Downlink Control Signalling and Transmission Modes for CoMP;" 3GPP TSG RAN WG1 Meeting #68bis, R1-121244; Jeju, Korea; Mar. 26-30, 2012 (2 pages).
Pantech; "DM RS port and sequence configuration for ePDCCH;" 3GPP TSG RAN Working Group 1 Meeting #68bis, R1-121365; Jeju, Korea; Mar. 26-30, 2012 (3 pages).
Samsung; "CSI-RS measurement restriction for DL CoMP;" 3GPP TSG RAN WG1 #68bis, R1-121630; Jeju, Korea; Mar. 26-30, 2012 (3 pages).
NTT DOCOMO, Inc.; "Consideration on Un link configuration" 3GPP TSG-RAN WG2 #69, R2-101542; San Francisco, USA; Feb. 22-26, 2010 (4 pages).
Office Action issued in corresponding European Application No. 13769098.8, mailed Oct. 13, 2015 (8 pages).
Extended Search Report issued in corresponding European Application No. 13769098.8, mailed Jan. 28, 2016 (24 pages).
Alcatel-Lucent et al.; "PDCCH Capacity Analysis and Design Principles for Enhanced PDCCH"; 3GPP TSG RAN WG1 Meeting #66bis, R1-113321; Zhuhai, China; Oct. 10-14, 2011 (6 pages).
Huawei et al.; "Downlink reference signals for additional carrier types"; 3GPP TSG RAN WG1 meeting #68, R1-120020; Dresden, Germany; Feb. 6-10, 2012 (3 pages).
Etri; "DM RS sequence setting for downlink CoMp "; 3GPP TSG RAN WG1 Meeting #67, R1-113957; San Francisco USA; Nov. 14-18, 2011 (3 pages).
NEC Group; "Design consideration for additional carrier type"; 3GPP TSG RAN WG1 Meeting #68, R1-120249; Dresden, Germany; Feb. 6-10, 2012 (3 pages).
Huawei et al.; "CSI-RS configuration and signalling"; 3GPP TSG RAN WG1 Meeting #66bis, R1-112902; Zhuhai, China; Oct. 10-14, 2011 (3 pages).
NTT DOCOMO, Inc.; "DL DM-RS sequence for Rel-11 CoMp"; 3GPP TSG RAN WG1 Meeting #67, R1-114074; San Francisco, USA; Nov. 14-18, 2011 (7 pages).
Office Action issued in the counterpart European Patent Application No. 13769098.8, mailed Dec. 13, 2016 (8 pages).
Office Action issued in corresponding Japanese Application No. 2012-081303, mailed Sep. 13, 2016 (6 pages).
Search Report issued Feb. 21, 2017, corresponding to Russian Patent Application No. 2014142969/07 (069428) (8 pages).
Extended European Search Report issued in the counterpart European Patent Application No. 17157593.9, dated May 26, 2017 (11 pages).

\* cited by examiner

RADIO COMMUNICATION SYSTEM, BASE STATION APPARATUS AND RADIO COMMUNICATION METHOD

TECHNICAL FIELD

The present invention relates to a radio communication system, a base station apparatus, and a radio communication method in a next-generation mobile communication system.

BACKGROUND ART

In a UMTS (Universal Mobile Telecommunications System) network, attempts are made to optimize features of the system, which are based on W-CDMA (Wideband Code Division Multiple Access), by adopting HSDPA (High Speed Downlink Packet Access) and HSUPA (High Speed Uplink Packet Access), for the purposes of improving spectral efficiency and improving the data rates. With this UMTS network, long-term evolution (LTE) is under study for the purposes of further increasing high-speed data rates, providing low delay, and so on (non-patent literature 1).

In the third-generation system, it is possible to achieve a transmission rate of maximum approximately 2 Mbps on the downlink by using a fixed band of approximately 5 MHz. Meanwhile, in the LTE system, it is possible to achieve a transmission rate of about maximum 300 Mbps on the downlink and about 75 Mbps on the uplink by using a variable band which ranges from 1.4 MHz to 20 MHz. Furthermore, with the UMTS network, successor systems of LTE are also under study for the purpose of achieving further broadbandization and higher speed (for example, "LTE-advanced" (LTE-A)).

This LTE-A system provides for multiple-user MIMO (MU-MIMO) transmission to transmit transmission information sequences from different transmitting antennas to different users at the same time. In MU-MIMO transmission, it is possible to transmit data for a plurality of user terminal UEs in the same time and the same frequency. When allocating downlink control information for many user terminal UEs to a PDCCH region, cases might occur where the PDCCH region to transmit downlink control information runs short. In this case, the number of user terminal UEs that can be multiplexed over the PDSCH region is limited. As a method of solving such shortage of the PDCCH region, it may be possible to extend the PDCCH allocation region beyond the control region of maximum three OFDM symbols from the subframe top (that is, extend the PDCCH region into the conventional PDSCH region) (enhanced PDCCH).

CITATION LIST

Non-Patent Literature

Non-Patent Literature 1: 3GPP, TR25.912 (V7.1.0), "Feasibility Study for Evolved UTRA and UTRAN," September 2006

SUMMARY OF INVENTION

Technical Problem

The enhanced PDCCH described above is a technique provided for by the LTE-A system, and, although parameters related to such new techniques need to be reported to a user terminal with adequate timing, under the present circumstances, with what timing such parameters should be reported to a user terminal is not even defined.

The present invention has been made in view of the above, and it is therefore an object of the present invention to provide a radio communication system, a base station apparatus, and a radio communication method that can notify parameters related to techniques provided for in the LTE-A system, to a user terminal, with adequate timing.

Solution to Problem

The radio communication system of the present invention provides a base station apparatus that is configured in compliance with an LTE-Advanced system standard, and a user terminal that is configured to be able to perform radio communication with the base station apparatus, and, in this radio communication system, the base station apparatus has a generating section that generates downlink control channel information related to an enhanced physical downlink control channel, and a notifying section that notifies the downlink control channel information to the user terminal using an RRC Connection Reconfiguration signal, and the user terminal has a receiving section that receives the RRC Connection Reconfiguration signal, and a setting section that sets up the downlink control channel information.

The base station apparatus of the present invention is a base station apparatus in a radio communication system providing the base station apparatus that is configured in compliance with an LTE-Advanced system standard, and a user terminal that is configured to be able to perform radio communication with the base station apparatus, and this base station apparatus has a generating section that generates downlink control channel information related to an enhanced physical downlink control channel, and a notifying section that notifies the downlink control channel information to the user terminal using an RRC Connection Reconfiguration signal.

The radio communication method of the present invention is a radio communication method in a radio communication system providing a base station apparatus that is configured in compliance with an LTE-Advanced system standard, and a user terminal that is configured to be able to perform radio communication with the base station apparatus, and this radio communication method includes the steps of: at the base station apparatus: generating downlink control channel information related to an enhanced physical downlink control channel; and notifying the downlink control channel information to the user terminal using an RRC Connection Reconfiguration signal; and, at the user terminal: receiving the RRC Connection Reconfiguration signal; and setting up the downlink control channel information.

Advantageous Effects of Invention

According to the present invention, it is possible to report parameters related to techniques provided for in the LTE-A system to a user terminal with adequate timing.

DESCRIPTION OF EMBODIMENTS

With the present invention, in a radio communication system having a base station apparatus that is configured in compliance with LTE-A system standards and a user terminal that is configured to be able to perform radio communication with this base station apparatus, information (parameters) related to techniques provided for in the LTE-A system is reported from the base station apparatus to the user terminal using RRC Connection Reconfiguration signals, and the information (parameters) is set up in the user terminal.

The information (parameters) related to techniques provided for in the LTE-A system may include, for example, the following:

(1) downlink control channel information, which relates to enhanced physical downlink control channels (e-PDCCHs);

(2) cell-specific reference signal information, which relates to cell-specific reference signals;

(3) sequence information, which relates to the initial pseudo-random sequence of downlink reference signals;

(4) uplink reference signal information, which relates to uplink DM-RSs (Demodulation-Reference Signals); and (5) radio resource information, which relates to radio resources for interference estimation to use in channel quality measurement in a user terminal.

(1) Downlink Control Channel Information Related to e-PDCCH

As described above, in MU-MIMO transmission in the LTE-A system, when downlink control information is allocated to a PDCCH region upon transmitting data to a plurality of user terminal UEs, the PDCCH region for transmitting the downlink control information may run short, and the number of user terminal UEs that can be multiplexed in the PDSCH region may be limited. Consequently, this might lead to the idea of extending the PDCCH allocation region outside or beyond the control region of maximum three OFDM symbols from the top of a subframe (e-PDCCH).

Figure 1A:
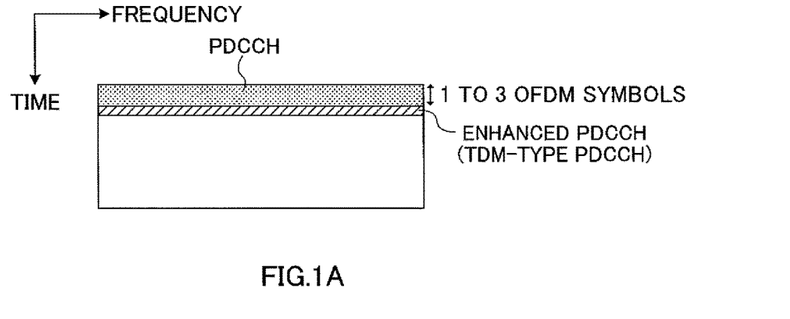
FIG. 1 provides diagrams to explain an e-PDCCH.
Figure 1B:
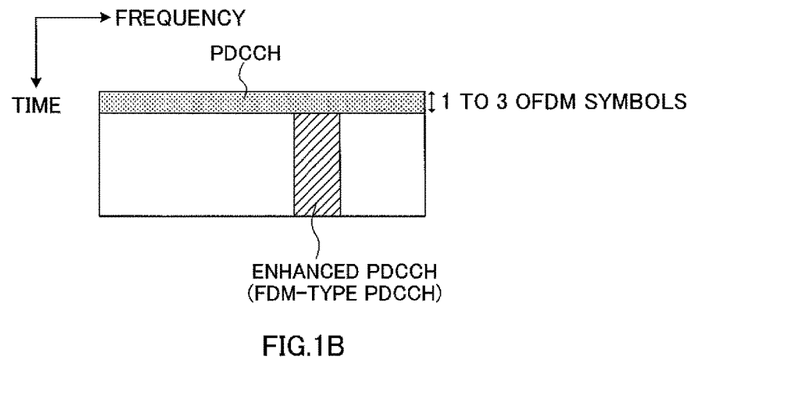

As for the method of extending the PDCCH region, there are a method of extending the conventional PDCCH region, which is maximum three OFDM symbols from the top of a subframe as shown in FIG. 1A, to four or more OFDM symbols (time-division (TDM) approach), and a method of frequency-dividing the PDSCH region and using a new PDCCH region as shown in FIG. 1B (frequency-division (FDM) approach). Consequently, the base station apparatus needs to report the multiplexing position of an e-PDCCH to a user terminal as a parameter (multiplexing position information).

Also, since MU-MIMO involves multiple-antenna transmission, the base station apparatus needs to report the transmission mode of the e-PDCCH (for example, transmission diversity, beam forming, etc.) to the user terminal as a parameter (transmission mode information). Also, the base station apparatus needs to report the transmission method of the e-PDCCH (for example, distributed transmission, localized transmission, simultaneous transmission, etc.) to the user terminal as a parameter (transmission method information). Furthermore, to use the e-PDCCH, the base station apparatus needs to report information about the antenna port of the reference signal (DM-RS: Demodulation-Reference Signal) to use to demodulate the e-PDCCH signal to the user terminal as a parameter.

(2) Cell-Specific Reference Signal Information

Figure 2:
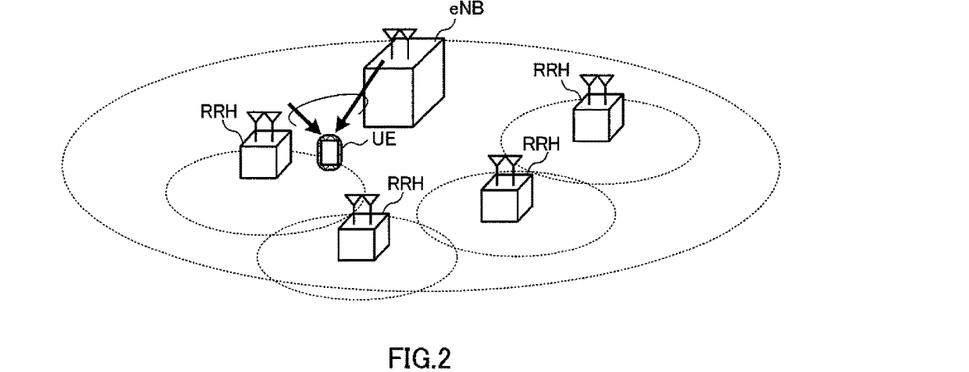
FIG. 2 is a diagram to explain $V_{Shift}$ for CRSs.

In the system shown in FIG. 2, formed in layers with a macro base station apparatus eNB (eNodeB) and a plurality of base station apparatus RRHs (Remote Radio Heads), cell-specific reference signals (CRSs) are transmitted in varying frequency resources so as not to interfere with each other. In the system of Rel-10, each base station apparatus RRH transmits a CRS using a frequency resource that is shifted through a predetermined amount in the frequency domain with respect to the frequency resource of the reference signal transmitted from the macro base station apparatus eNB. That is, CRSs to be transmitted from the base station apparatus RRHs are shifted in the frequency direction with respect to the CRS of the macro base station apparatus eNB. This amount of shift $V_{shift}$ is determined based on unique cell IDs (cell IDs) ($V_{shift}$=(cell ID mod 6)). The base station apparatus needs to report this information (information about CRS multiplexing positions) to the user terminal UE as cell-specific reference signal information (parameter).

CRSs are transmitted in all downlink signal subframes in cells that transmit PDSCH (Physical Downlink Shard Channel) signals. Also, CRSs are transmitted from one antenna port or a plurality of antenna ports. Consequently, the base station apparatus needs to report the number of CRS antenna ports to the user terminal UE as cell-specific reference signal information (parameter). Furthermore, the base station apparatus needs to report information as to whether or not a CRS is present in a subframe (for example, MBSFN configuration), to the user terminal UE as cell-specific reference signal information (parameter).

(3) Sequence Information Related to Downlink Reference Signals

In DM-RSs (Demodulation-Reference Signals) or CSI-RSs (Channel State Information-Reference Signals), which are downlink reference signals, a pseudo-random sequence of a scrambling sequence is defined as follows.

A DM-RS sequence r (m) is defined by following equation 1 (Release 10 LTE). The pseudo-random sequence c (i) that is included in this equation 1 is initialized as follows ($C_{init}$). As obvious from this initialized pseudo-random sequence $C_{init}$, a term that varies depending on the cell ID, $N_{ID}^{cell}$, is included in the initialized pseudo-random sequence $C_{init}$. Note that this pseudo-random sequence c (i) is generated using a length-31 Gold sequence. Also, in the initialized pseudo-random sequence $C_{init}$, scrambling identification information (SCID) is included. This SCID assumes the values of 0 and 1 (the beginning of each subframe). In this way, the pseudo-random sequence to be used upon generating a DM-RS sequence r (m) is set to vary between cell IDs.

[1]

$$r(m) = \frac{1}{\sqrt{2}}(1-2\cdot c(2m)) + j\frac{1}{\sqrt{2}}(1-2\cdot c(2m+1)),$$

(Equation 1)

$$m = \begin{cases} 0, 1, \ldots, 12N_{RB}^{max,DL}-1 & \text{normal cyclic prefix} \\ 0, 1, \ldots, 16N_{RB}^{max,DL}-1 & \text{extended cyclic prefix} \end{cases}$$

Initialized pseudo-random sequence $$c_{init} = (\lfloor n_s/2 \rfloor + 1) \cdot (2N_{ID}^{cell}+1) \cdot 2^{16} + n_{SCID}$$

where $n_{SCID}$: 0, 1 (the beginning of each subframe);
$N_{RB}^{PDSCH}$: bandwidth of corresponding resource block of PDSCH transmission; and c (i): pseudo-random sequence (length-31 Gold sequence).

Also, a CSI-RS sequence $r_{1,ns}$ (m) is defined by following equation 2 (Release 10 LTE). The pseudo-random sequence c (i) that is included in this equation 2 is initialized as follows ($C_{init}$). As obvious from this initialized pseudo-random sequence $C_{init}$, a term that varies depending on the cell ID, $N_{ID}^{cell}$, is included in the initialized pseudo-random sequence $C_{init}$. In this way, the pseudo-random sequence that is used upon generating the CSI-RS sequence $r_{1,ns}$ (m) is also set to vary between cell IDs.

[2]

$$r_{l,n_s}(m) = \frac{1}{\sqrt{2}}(1-2\cdot c(2m)) + j\frac{1}{\sqrt{2}}(1-2\cdot c(2m+1)),$$

(Equation 2)

$$m = 0, 1, \ldots, N_{RB}^{max,DL}-1$$

$$c_{init} = 2^{10}\cdot(7\cdot(n_s+1)+l+1)\cdot(2\cdot N_{ID}^{cell}+1) + 2\cdot N_{ID}^{cell} + N_{CP}$$

where $n_s$: slot number in a radio frame; and
l: OFDM symbol number in a slot $$N_{CP} = \begin{cases} 1 & \text{for normal } CP \\ 0 & \text{for extended } CP \end{cases}$$

The base station apparatus needs to notify the above pseudo-random sequence and related parameters (for example, parameters related to scrambling identification information (SCID) and cell IDs) to the user terminal UE as sequence information.

(4) Uplink Reference Signal Information

For DM-RSs for demodulating uplink PUSCH (Physical Uplink Shard Channel) signals and PUCCH (Physical Uplink Control Channel) signals, information about the base sequence, information about the amount of offset (the amount of shift) from the PUCCH sequence, or information about the amount of cyclic shift hopping are required on the user terminal side. Consequently, the base station apparatus needs to notify information about the base sequence, information about the amount of offset (the amount of shift) from the PUCCH sequence or information about the amount of cyclic shift hopping to the user terminal UE as uplink reference signal information (parameter).

(5) Radio Resource Information

This radio resource information is information related to radio resources for interference estimation to be used in channel quality (CQI: Channel Quality Indicator) measurement in a user terminal. CQIs are measured in the user terminal using CSI-RSs transmitted from the base station apparatus. As CSI-RSs, non-zero-power CSI-RSs and zero-power CSI-RSs are defined. With non-zero-power CSI-RSs, transmission power is distributed to the resources where the CSI-RSs are allocated, and, with zero-power CSI-RSs, transmission power is not distributed to the resources where the CSI-RSs are allocated (that is, the CSI-RSs are "muted").

When CQIs are calculated with CSI-RSs, the accuracy of interference measurement is important. By using CSI-RSs, which are user-specific reference signals, CSI-RSs from a plurality of transmission points can be separated in a user terminal, so that interference measurement based on CSI-RSs is promising. However, since the density of CSI-RSs in one resource block is low according to the provisions of LTE (Rel. 10 LTE), interference from other transmission points (other cells) cannot be measured with high accuracy.

Figure 3:
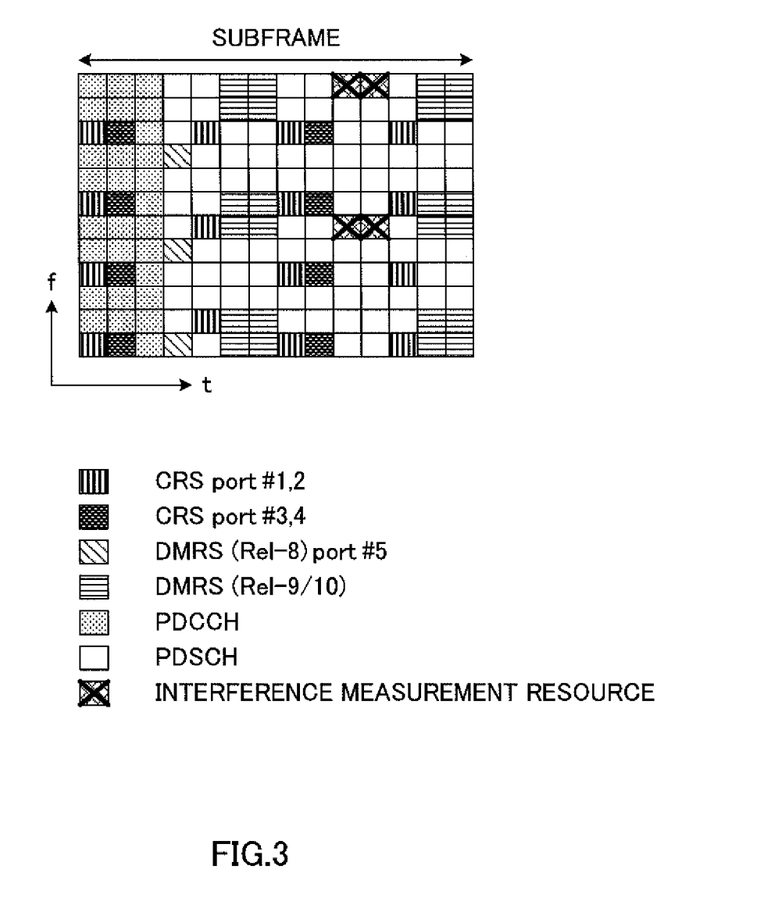
FIG. 3 is a diagram to show resources for interference measurement.

So, the applicant has added zero-power CSI-RSs, which are used in interference measurement alone (the radio resources with "x" symbols in FIG. 3) as shown in FIG. 3. By this means, it is possible to estimate interference signals for the calculation of CQIs in the user terminal, by using resource elements (REs) in which the downlink shared data channel (PDSCH) is not transmitted.

Consequently, the base station apparatus needs to notify information related to radio resources for interference estimation to be used in channel quality (CQI) measurement in the user terminal, to the user terminal UE as radio resource information (parameter).

Next, the method of notifying (the method of RRC signaling) the above-described information (parameters) related to techniques provided for in the LTE-A system from the base station apparatus to the user terminal will be described.

With the present invention, the base station apparatus notifies the above-described information (parameters) related to techniques provided for in the LTE-A system to the user terminal, separately, with the timing of an RRC Connection Reconfiguration signal. That is, the base station apparatus notifies the above information using the RRC CONNECTION RECONFIGURATION signal in the processing steps shown in FIG. 4.

Figure 4:
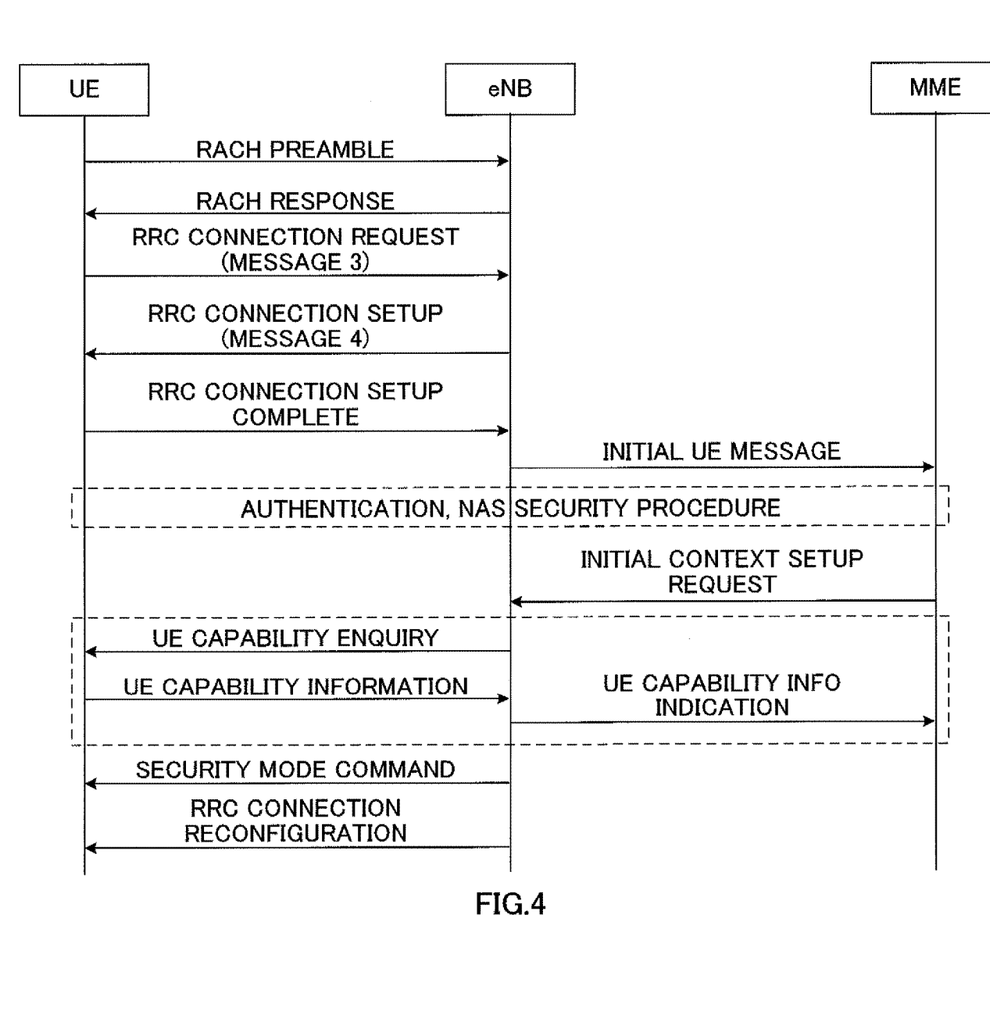
FIG. 4 is a diagram to show a sequence when report information is reported by means of dedicated signals.

In accordance with the processing steps, first, the user terminal UE transmits a RACH preamble to the base station apparatus eNB. Upon receiving the RACH preamble, the base station apparatus eNB transmits a RACH response to the user terminal UE. Next, the user terminal UE transmits an RRC CONNECTION REQUEST (Message 3) to the base station apparatus eNB. Upon receiving the RRC CONNECTION REQUEST (Message 3), the base station apparatus eNB transmits an RRC CONNECTION SETUP (Message 4) to the user terminal UE.

Upon receiving the RRC CONNECTION SETUP (Message 4), the user terminal UE transmits an RRC CONNECTION SETUP COMPLETE to the base station apparatus eNB. Upon receiving the RRC CONNECTION SETUP COMPLETE, the base station apparatus eNB transmits an INITIAL UE MESSAGE to a mobility management node MME, which is a higher station apparatus. By this means, authentication and NAS security procedures are executed between the user terminal UE and the mobility management node MME. After that, the mobility management node MME transmits an INITIAL CONTEXT SETUP REQUEST to the base station apparatus eNB.

Note that, when a UE CAPABILITY is not included in the INITIAL CONTEXT SETUP REQUEST, the base station apparatus eNB transmits a UE CAPABILITY ENQUIRY to the user terminal UE. Upon receiving the UE CAPABILITY ENQUIRY, the user terminal UE transmits a UE CAPABILITY INFORMATION to the base station apparatus eNB. Then, the base station apparatus eNB transmits a UE CAPABILITY INFO INDICATION to the mobility management node MME.

Figure 5:
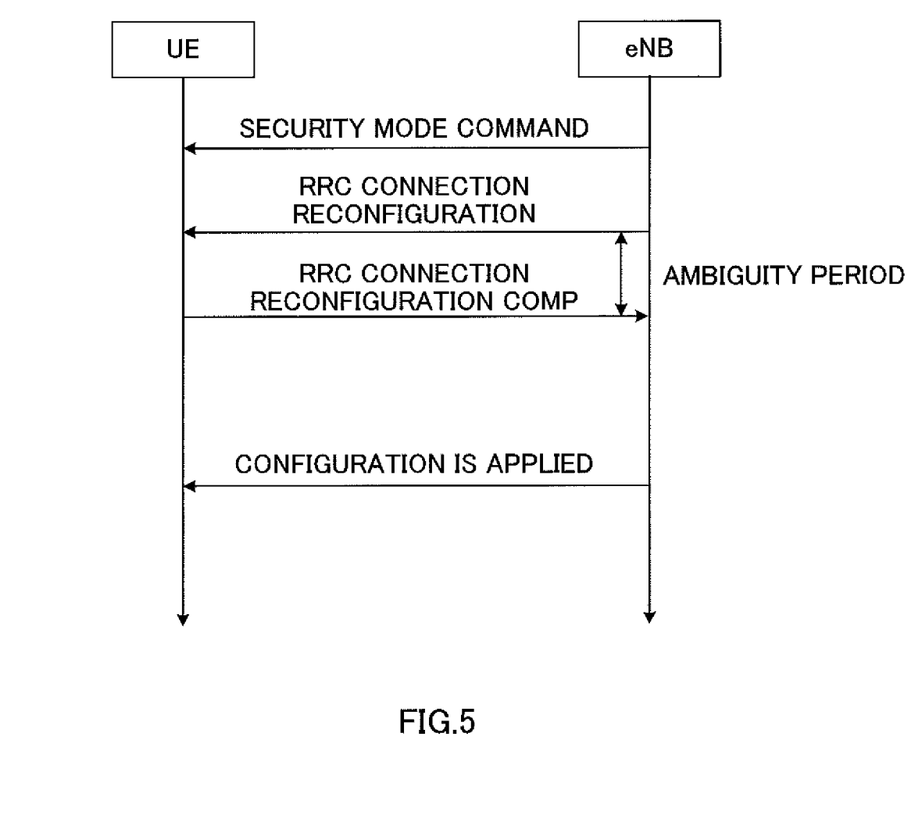
FIG. 5 is a diagram to show a sequence when report information is reported by means of dedicated signals.

Next, the base station apparatus eNB transmits a SECURITY MODE COMMAND to the user terminal UE. After that, the base station apparatus eNB transmits an RRC CONNECTION RECONFIGURATION, which includes the above-described information (parameters) related to techniques provided for in the LTE-A system, to the user terminal UE. After that, as shown in FIG. 5, upon receiving the RRC CONNECTION RECONFIGURATION, the user terminal UE transmits an RRC CONNECTION RECONFIGURATION COMP to the base station apparatus eNB. Then, the user terminal UE sets up the above-described information (parameters) related to techniques provided for in the LTE-A system. Also, after having received the RRC CONNECTION RECONFIGURATION COMP—that is, after the ambiguity period, in which it is possible to decide that the configurations of the above-described information (parameters) related to techniques provided for in the LTE-A system has been identified, is over—the base station apparatus eNB applies that configuration.

In this way, according to the present invention, the base station apparatus eNB notifies the above-described information (parameters) related to techniques provided for in the LTE-A system, to the user terminal UE, with the timing of an RRC CONNECTION RECONFIGURATION, and the user terminal UE sets up these pieces of information (parameters). Through such steps, it is possible to report parameters related to techniques provided for in the LTE-A system to the user terminal with adequate timing.

(Configuration of Radio Communication System)

Figure 6:
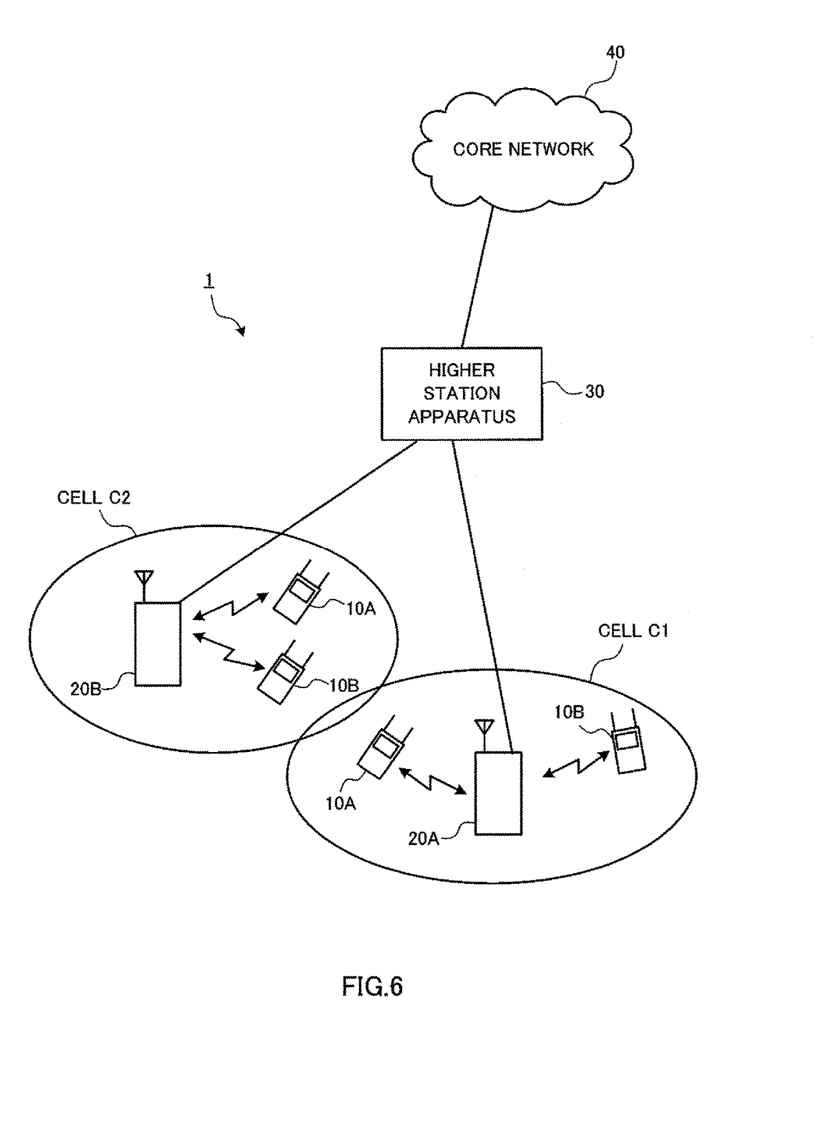
FIG. 6 is a diagram to explain a system configuration of a radio communication system.

Now, a radio communication system according to an embodiment of the present invention will be described below in detail. FIG. 6 is a diagram to explain a system configuration of a radio communication system according to the present embodiment. Note that the radio communication system shown in FIG. 6 is a system to accommodate, for example, the LTE system or SUPER 3G. In this radio communication system, carrier aggregation to group a plurality of fundamental frequency blocks into one, where the system band of the LTE system is one unit, is used. Also, this radio communication system may be referred to as "IMT-Advanced" or may be referred to as "4G."

As shown in FIG. 6, the radio communication system 1 is configured to include radio base station apparatuses 20A and 20B, and a plurality of first and second user terminals 10A and 10B that communicate with these radio base station apparatuses 20A and 20B. The radio base station apparatuses 20A and 20B are connected with a higher station apparatus 30, and this higher station apparatus 30 is connected with a core network 40. Also, the radio base station apparatuses 20A and 20B are connected with each other by wire connection or by wireless connection. The first and second user terminals 10A and 10B are able to communicate with the radio base station apparatuses 20A and 20B in cells C1 and C2. Note that the higher station apparatus 30 may be, for example, an access gateway apparatus, a radio network controller (RNC), a mobility management node (MME) and so on, but is by no means limited to these. Also, between cells, when necessary, CoMP transmission is controlled by a plurality of base stations.

Although the first and second user terminals 10A and 10B may be either LTE terminals or LTE-A terminals, the following description will be given simply with respect to the first and second user terminals, unless specified otherwise. Also, although the first and second user terminals 10A and 10B will be described to perform radio communication with the radio base station apparatuses 20A and 2013 for ease of explanation, more generally, user equipment (UE), including both mobile terminal apparatuses and fixed terminal apparatuses, may be used as well.

In the radio communication system 1, as radio access schemes, OFDMA (Orthogonal Frequency Division Multiple Access) is applied to the downlink, and SC-FDMA (Single-Carrier Frequency Division Multiple Access) is applied to the uplink, but the uplink radio access scheme is by no means limited to this. OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing, per terminal, the system band into bands formed with one or continuous resource blocks, and allowing a plurality of terminals to use mutually different bands.

Downlink communication channels include a PDSCH, which is used by the first and second user terminals 10A and 10B on a shared basis as a downlink data channel, and downlink L1/L2 control channels (PDCCH, PCFICH, PHICH). Transmission data and higher control information are transmitted by the PDSCH. PDSCH and PUSCH scheduling information and so on are transmitted by the PDCCH. The number of OFDM symbols to use for the PDCCH is transmitted by the PCFICH (Physical Control Format Indicator Channel). HARQ ACK and NACK for the PUSCH are transmitted by the PHICH (Physical Hybrid-ARQ Indicator Channel).

Uplink communication channels include a PUSCH, which is used by each user terminal on a shared basis as an uplink data channel, and a PUCCH, which is an uplink control channel. By means of this PUSCH, transmission data and higher control information are transmitted. Furthermore, the PUCCH transmits received downlink signal quality information (CQI), ACK/NACK, and so on.

Now, an overall configuration of a radio base station apparatus according to the present embodiment will be explained with reference to FIG. 7. Note that the radio base station apparatuses 20A and 20B have the same configuration and therefore hereinafter will be described simply as "radio base station apparatus 20." Also, the first and second user terminals 10A and 10B, which will be described later, also have the same configuration and therefore hereinafter will be described simply as "user terminal 10."

The radio base station apparatus 20 includes transmitting/receiving antennas 201, amplifying sections 202, transmitting/receiving sections (notifying sections) 203, a baseband signal processing section 204, a call processing section 205, and a transmission path interface 206. Transmission data to be transmitted from the radio base station apparatus 20 to the user terminal on the downlink is input from the higher station apparatus 30, into the baseband signal processing section 204, via the transmission path interface 206.

In the baseband signal processing section 204, a signal of a downlink data channel is subjected to a PDCP layer process, division and coupling of transmission data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process, and a precoding process. Furthermore, a signal of a physical downlink control channel, which is a downlink control channel, is also subjected to transmission processes such as channel coding and an inverse fast Fourier transform.

Also, the baseband signal processing section 204 notifies control information for allowing each user terminal 10 to perform radio communication with the radio base station 20, to the user terminals 10 connected to the same cell, by a broadcast channel. The information for allowing communication in the cell includes, for example, the uplink or downlink system bandwidth, root sequence identification information (root sequence index) for generating random access preamble signals in the PRACH (Physical Random Access Channel), and so on.

Baseband signals that are output from the baseband signal processing section 204 are converted into a radio frequency band in the transmitting/receiving sections 203. The amplifying sections 202 amplify the radio frequency signals having been subjected to frequency conversion, and output the results to the transmitting/receiving antennas 201. Note that the transmitting/receiving sections 203 constitute a receiving means to receive uplink signals including information about phase differences between a plurality of cells and PMIs, and a transmitting means to transmit transmission signals by coordinated multiple point transmission. Also, the transmitting/receiving sections 203 function as a notifying section when the radio base station apparatus notifies candidate inter-cell CSI values to the user terminal.

Meanwhile, as for signals to be transmitted from the user terminal 10 to the radio base station apparatus 20 on the uplink, radio frequency signals that are received by the transmitting/receiving antennas 201 are amplified in the amplifying sections 202, converted into baseband signals through frequency conversion in the transmitting/receiving sections 203, and input in the baseband signal processing section 204.

The baseband signal processing section 204 performs an FFT process, an IDFT process, error correction decoding, a MAC retransmission control receiving process, and RLC layer and PDCP layer receiving processes of the transmission data that is included in the baseband signal received on the uplink. The decoded signals are transferred to the higher station apparatus 30 through the transmission path interface 206.

The call processing section 205 performs call processing such as setting up and releasing communication channels, manages the state of the radio base station apparatus 20 and manages the radio resources.

Figure 7:
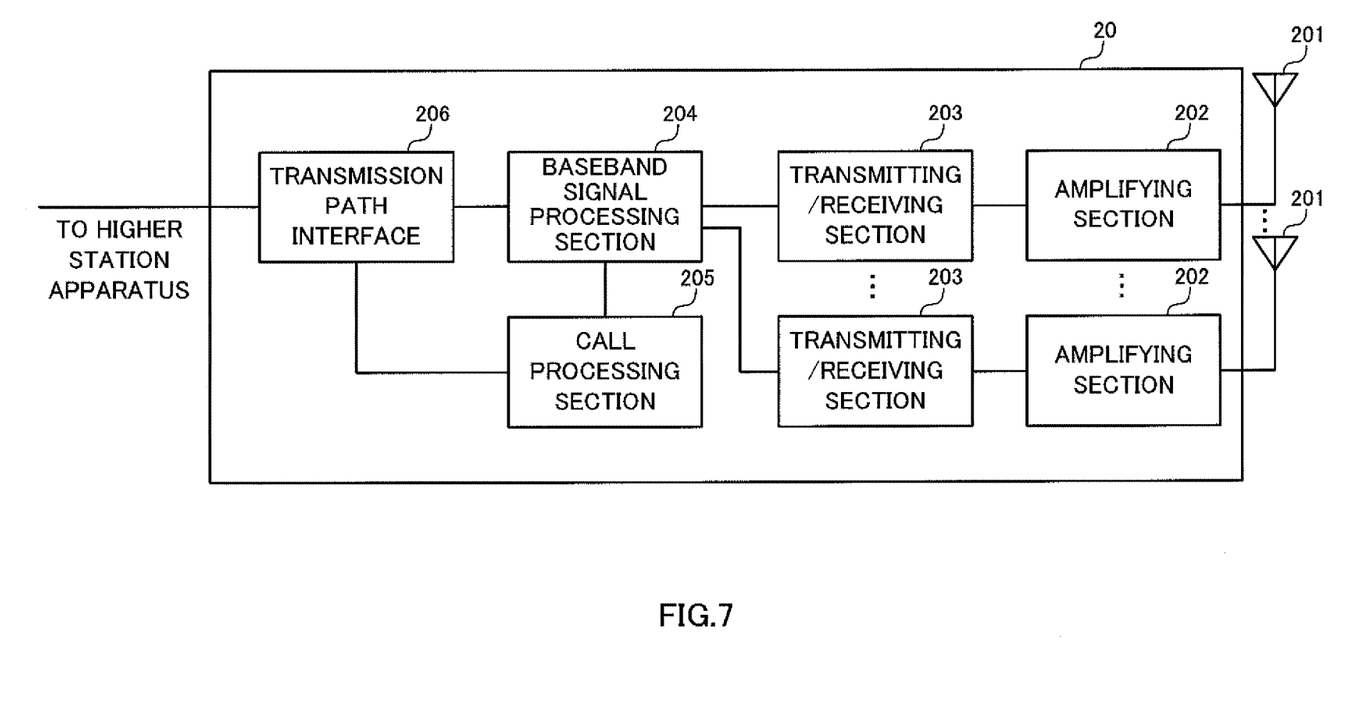
FIG. 7 is a diagram to explain an overall configuration of a base station apparatus.
Figure 8:
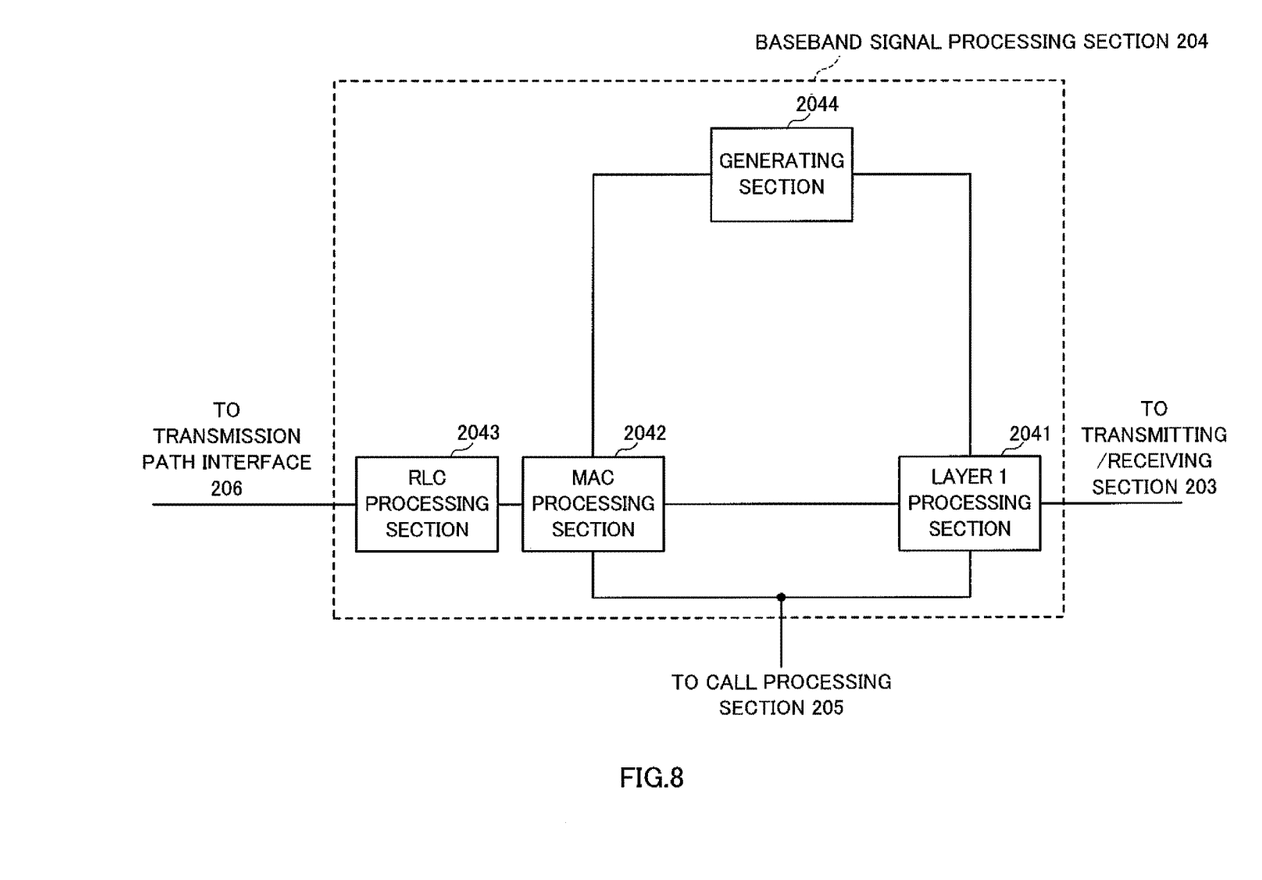
FIG. 8 is a functional block diagram corresponding to a radio communication method by a base station apparatus.

FIG. 8 is a block diagram to show a configuration of a baseband signal processing section in the radio base station apparatus shown in FIG. 7. The baseband signal processing section 204 is primarily formed with a layer 1 processing section 2041, a MAC processing section 2042, an RLC processing section 2043 and a generating section 2044.

The layer 1 processing section 2041 mainly performs processes related to the physical layer. The layer 1 processing section 2041 performs processes for a signal received on the uplink, including, for example, channel decoding, a discrete Fourier transform (DFT), frequency demapping, an inverse fast Fourier transform (IFFT), data demodulation and so on. Also, the layer 1 processing section 2041 performs processes for a signal to transmit on the downlink, including channel coding, data modulation, frequency mapping, an inverse fast Fourier transform (IFFT) and so on.

The MAC processing section 2042 performs processes for a signal that is received on the uplink such as MAC layer retransmission control, scheduling for the uplink/downlink, transport format selection for the PUSCH/PDSCH, resource block selection for the PUSCH/PDSCH and so on.

The RLC processing section 2043 performs, for a packet that is received on the uplink/a packet to transmit on the downlink, packet division, packet combining, RLC layer retransmission control and so on.

The generating section 2044 generates information (parameters) related to techniques provided for in the LTE-A system. For example, the generating section 2044 generates (1) downlink control channel information related to e-PDCCHs (information about the transmission method of e-PDCCH signals, multiplexing position information, transmission mode information, or information about the antenna ports of reference signals to use to demodulate e-PDCCH signals), (2) cell-specific reference signal information related to cell-specific reference signals (information about the multiplexing positions of cell-specific reference signals, information about the number of antenna ports of cell-specific reference signals of neighboring cells, or information as to whether or not a cell-specific reference signal is present in a subframe), (3) sequence information related to the initial pseudo-random sequence of downlink reference signals (information about the initial pseudo-random sequence of DM-RSs or CSI-RSs), (4) uplink reference signal information related to uplink DM-RSs (information about the base sequence, information about the amount of offset from the PUCCH sequence, or information about the amount of cyclic shift hopping), and (5) radio resource information related to radio resources for interference estimation to be used in channel quality measurement in a user terminal.

Next, an overall configuration of a user terminal according to the present embodiment will be described with reference to FIG. 9. An LTE terminal and an LTE-A terminal have the same hardware configurations in principle parts, and therefore will be described indiscriminately. A user terminal 10 has transmitting/receiving antennas 101, amplifying sections 102, transmitting/receiving sections (receiving sections) 103, a baseband signal processing section 104, and an application section 105.

As for downlink data, radio frequency signals that are received in the transmitting/receiving antennas 101 are amplified in the amplifying sections 102, and subjected to frequency conversion and converted into baseband signals in the transmitting/receiving sections 103. The baseband signals are subjected to receiving processes such as an FFT process, error correction decoding and retransmission control, in the baseband signal processing section 104. In this downlink data, downlink transmission data is transferred to the application section 105. The application section 105 performs processes related to higher layers above the physical layer and the MAC layer. Also, in the downlink data, broadcast information is also transferred to the application section 105.

Meanwhile, uplink transmission data is input from the application section 105 into the baseband signal processing section 104. The baseband signal processing section 104 performs a mapping process, a retransmission control (HARQ) transmission process, channel coding, a DFT process, and an IFFT process. Baseband signals that are output from the baseband signal processing section 104 are converted into a radio frequency band in the transmitting/receiving sections 103. After that, the amplifying sections 102 amplify the radio frequency signals having been subjected to frequency conversion and transmit the results from the transmitting/receiving antennas 101. Note that the transmitting/receiving sections 103 constitute a transmitting means to transmit information about phase differences, information about connecting cells, selected PMIs and so on, to the radio base station apparatus eNBs of a plurality of cells, and a receiving means to receive downlink signals.

Figure 9:
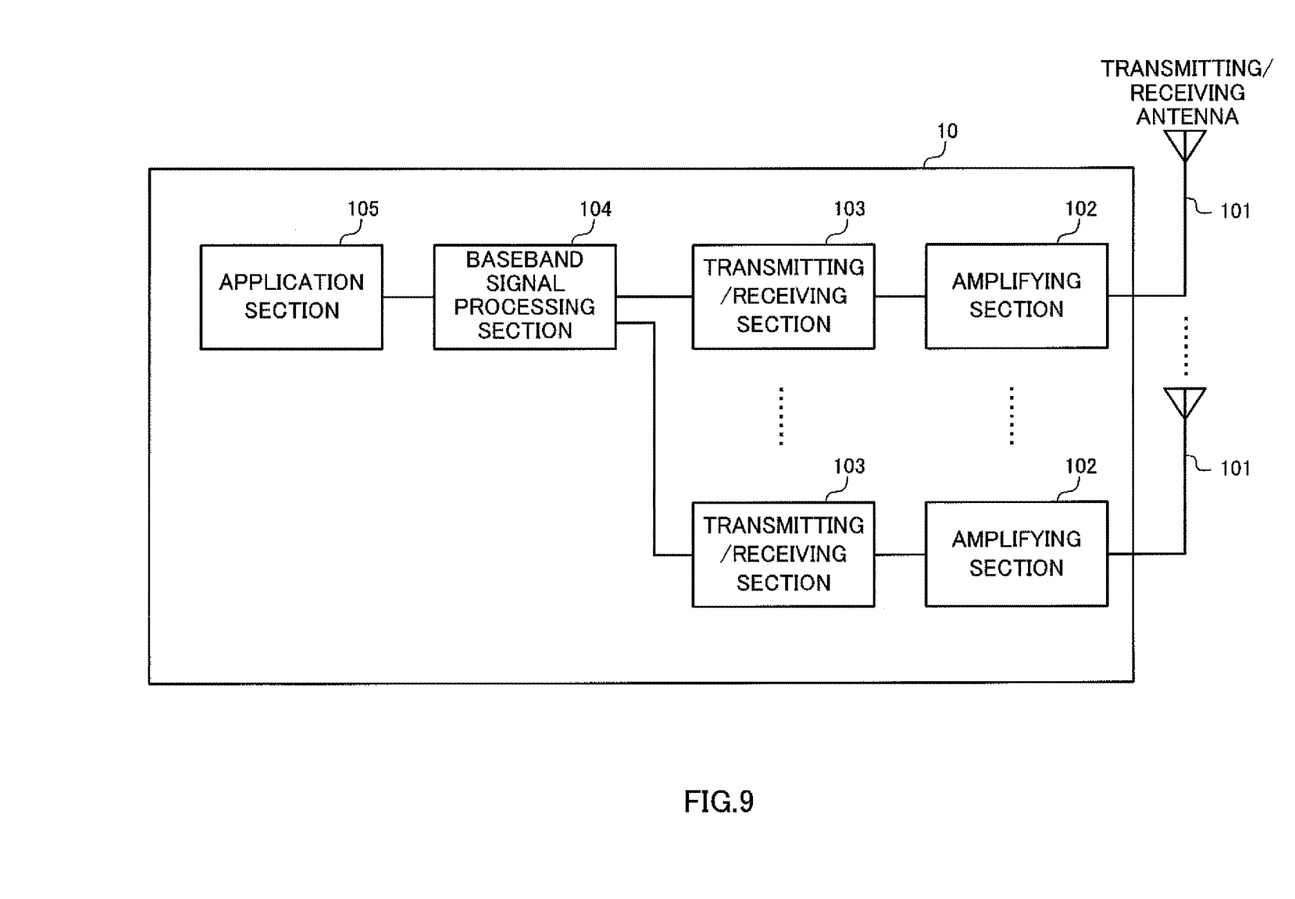
FIG. 9 is a diagram to explain an overall configuration of a user terminal.
Figure 10:
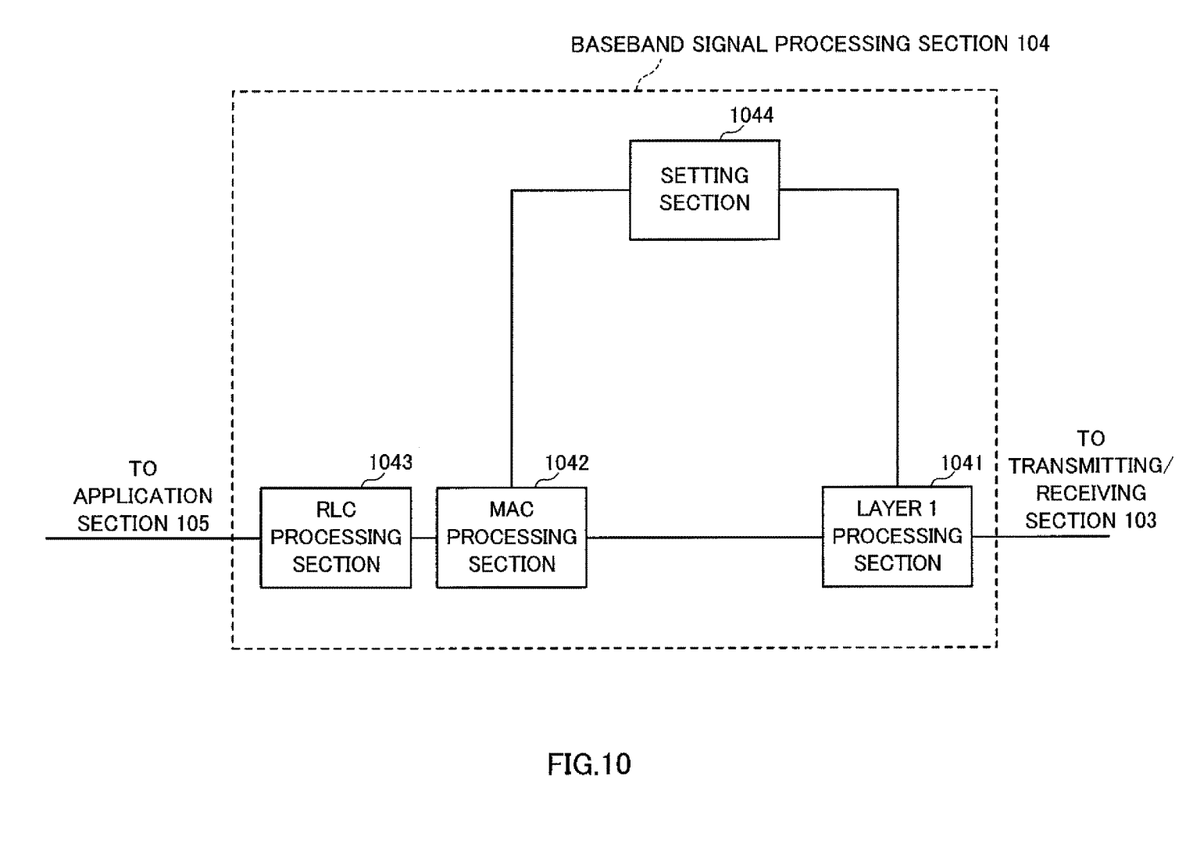
FIG. 10 is a functional block diagram corresponding to a radio communication method by a user terminal.

FIG. 10 is a block diagram to show a configuration of a baseband signal processing section in the user terminal shown in FIG. 9. The baseband signal processing section 104 is primarily formed with a layer 1 processing section 1041, a MAC processing section 1042, an RLC processing section 1043 and a setting section 1044.

The layer 1 processing section 1041 mainly performs processes related to the physical layer. The layer 1 processing section 1041 performs processes for a signal that is received on the downlink, including, for example, channel decoding, a discrete Fourier transform (DFT), frequency demapping, an inverse fast Fourier transform (IFFT), data demodulation and so on. Also, the layer 1 processing section 1041 performs processes for a signal to transmit on the uplink, including channel coding, data modulation, frequency mapping, an inverse fast Fourier transform (IFFT), and so on.

The MAC processing section 1042 performs, for a signal that is received on the downlink, MAC layer retransmission control (HARQ), an analysis of downlink scheduling information (specifying the PDSCH transport format and specifying the PDSCH resource blocks) and so on. Also, the MAC processing section 1042 performs, for a signal to transmit on the uplink, MAC retransmission control, an analysis of uplink scheduling information (specifying the PUSCH transport format and specifying the PUSCH resource blocks) and so on.

The RLC processing section 1043 performs, for a packet received on the downlink/a packet to transmit on the uplink, packet division, packet combining, retransmission control in the RLC layer and so on.

The setting section 1044 sets up the information (parameters) related to techniques provided for in the LTE-A system reported with the timing of the RRC CONNECTION RECONFIGURATION (RRC signaling). This information includes (1) downlink control channel information related to e-PDCCHs (information about the transmission method of e-PDCCH signals, multiplexing position information, transmission mode information, or information about the antenna ports of reference signals to use to demodulate e-PDCCH signals), (2) cell-specific reference signal information related to cell-specific reference signals (information about the multiplexing positions of cell-specific reference signals, information about the number of antenna ports of cell-specific reference signals of neighboring cells, or information as to whether or not a cell-specific reference signal is present in a subframe), (3) sequence information related to the initial pseudo-random sequence of downlink reference signals (information about the initial pseudo-random sequence of DM-RSs or CSI-RSs), (4) uplink reference signal information related to uplink DM-RSs (information about the base sequence, information about the amount of offset from the PUCCH sequence, or information about the amount of cyclic shift hopping), and (5) radio resource information related to radio resources for interference estimation to be used in channel quality measurement in a user terminal.

In a radio communication system having the above-described configuration, information related to techniques provided for in the LTE-A system is generated in the generating section 2044 in the base station apparatus. The base station apparatus notifies this information to the user terminal using an RRC Connection Reconfiguration signal. The user terminal receives the RRC Connection Reconfiguration signal, and sets up the information related to techniques provided for in the LTE-A system in the setting section 1044. Also, after having received the RRC CONNECTION RECONFIGURATION COMP—that is, after the ambiguity period, in which it is possible to decide that the configurations of the above-described information related to techniques provided for in the LTE-A system has been identified, is over—the base station apparatus eNB applies that configuration.

Now, although the present invention has been described in detail with reference to the above embodiment, it should be obvious to a person skilled in the art that the present invention is by no means limited to the embodiment described herein. The present invention can be implemented with various corrections and in various modifications, without departing from the spirit and scope of the present invention defined by the recitations of the claims. Consequently, the descriptions herein are provided only for the purpose of explaining examples, and should by no means be construed to limit the present invention in any way.

The disclosure of Japanese Patent Application No. 2012-081303, filed on Mar. 30, 2012, including the specification, drawings, and abstract, is incorporated herein by reference in its entirety.

The invention claimed is:

1. A radio communication system comprising a base station apparatus that is configured in compliance with an LTE-Advanced system standard, and a user terminal that is configured to be able to perform radio communication with the base station apparatus, wherein:
    the base station apparatus comprises:
        a generating section that generates cell-specific reference signal formation related to a cell-specific reference signal; and
        a notifying section that notifies, using an RRC Connection Reconfiguration signal, the user terminal of the cell-specific reference signal information comprising at least one of information about a number of antenna ports of the cell-specific reference signal and information about an MBSFN configuration; and
    the user terminal comprises:
        a receiving section that receives the RRC Connection Reconfiguration signal; and
        a setting section that sets up the cell-specific reference signal information.

2. A radio communication system comprising a base station apparatus that is configured in compliance with an LTE-Advanced system standard, and a user terminal that is configured to be able to perform radio communication with the base station apparatus, wherein:
    the base station apparatus comprises:
        a generating section that generates uplink reference signal information related to an uplink DM-RS (Demodulation-Reference Signal);
        a notifying section that notifies the user terminal of the uplink reference signal information using an RRC Connection Reconfiguration signal; and
    the user terminal comprises:
        a receiving section that receives the RRC Connection Reconfiguration signal; and a setting section that sets up the uplink reference signal information,
wherein the uplink reference signal information comprises information about an amount of offset from a physical uplink control channel sequence.

3. A base station apparatus in a radio communication system comprising the base station apparatus that is configured in compliance with an LTE-Advanced system standard, and a user terminal that is configured to be able to perform radio communication with the base station apparatus, the base station apparatus comprising:
   a generating section that generates cell-specific reference signal information related to a cell-specific reference signal; and
   a notifying section that notifies, using an RRC Connection Reconfiguration signal, the user terminal of the cell-specific reference signal information comprising at least one of information about a number of antenna ports of the cell-specific reference signal and information about an MBSFN configuration.

4. A base station apparatus in a radio communication system comprising the base station apparatus that is configured in compliance with an LTE-Advanced system standard, and a user terminal that is configured to be able to perform radio communication with the base station apparatus, the base station apparatus comprising:
   a generating section that generates uplink reference signal information related to an uplink DM-RS (Demodulation-Reference Signal); and
   a notifying section that notifies the user terminal of the uplink reference signal information using an RRC Connection Reconfiguration signal,
   wherein the uplink reference signal information comprises information about an amount of offset from a physical uplink control channel sequence.

5. A radio communication method in a radio communication system comprising a base station apparatus that is configured in compliance with an LTE-Advanced system standard, and a user terminal that is configured to be able to perform radio communication with the base station apparatus, the radio communication method comprising the steps of:
   at the base station apparatus:
      generating cell-specific reference signal information related to a cell-specific reference signal; and
      notifying, using an RRC Connection Reconfiguration signal, the user terminal of the cell-specific reference signal information comprising at least one of information about a number of antenna ports of the cell specific reference signal and information about an MBSFN configuration; and
   at the user terminal:
      receiving the RRC Connection Reconfiguration signal; and
      setting up the cell-specific reference signal information.

6. A radio communication method in a radio communication system comprising a base station apparatus that is configured in compliance with an LTE-Advanced system standard, and a user terminal that is configured to be able to perform radio communication with the base station apparatus, the radio communication method comprising the steps of:
   at the base station apparatus:
      generating uplink reference signal information related to an uplink DM-RS (Demodulation-Reference Signal);
      notifying the user terminal of the uplink reference signal information using air RRC Connection Reconfiguration signal; and
   at the user terminal:
      receiving the RRC Connection Reconfiguration signal; and
      setting up the uplink reference signal information,
      wherein the uplink reference signal information comprises information about an amount of offset from a physical uplink control channel sequence.

* * * * *

UNITED STATES PATENT AND TRADEMARK OFFICE
CERTIFICATE OF CORRECTION

PATENT NO. : 9,769,809 B2  
APPLICATION NO. : 14/387445  
DATED : September 19, 2017  
INVENTOR(S) : Nagata et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 119 days.

Signed and Sealed this  
Sixth Day of February, 2018

Joseph Matal  
*Performing the Functions and Duties of the*  
*Under Secretary of Commerce for Intellectual Property and*  
*Director of the United States Patent and Trademark Office*